United States Patent
Yu et al.

(10) Patent No.: US 7,925,380 B2
(45) Date of Patent: Apr. 12, 2011

(54) INTEGRATED TRANSPORTATION CONTROL FOR WAFER FABRICATION FACILITY

(75) Inventors: Chih-Yuan Yu, Chang Hua (TW);
Ren-Chyi You, Dongshan Shiang (TW);
Ming Wang, Zhonghe (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 985 days.

(21) Appl. No.: 11/458,554

(22) Filed: Jul. 19, 2006

(65) Prior Publication Data
US 2008/0021593 A1   Jan. 24, 2008

(51) Int. Cl.
*G06F 7/00*   (2006.01)
(52) U.S. Cl. .......................... 700/228; 700/121
(58) Field of Classification Search .............. 700/228, 700/121
See application file for complete search history.

(56) References Cited

U.S. PATENT DOCUMENTS

| | | | |
|---|---|---|---|
| 6,285,951 B1 | 9/2001 | Gaskins et al. | |
| 6,647,316 B2* | 11/2003 | Bahri et al. | 700/217 |
| 2003/0129045 A1* | 7/2003 | Bonora et al. | 414/217 |
| 2004/0067601 A1* | 4/2004 | Sun et al. | 438/14 |
| 2004/0073331 A1 | 4/2004 | Chang et al. | |
| 2006/0285945 A1* | 12/2006 | Hofmeister et al. | 414/217 |

FOREIGN PATENT DOCUMENTS
TW        557480        10/2003

OTHER PUBLICATIONS

J. T. Lin et al., "Connecting Transport AMHS In A Wafer Fab", International Journal of Production Research ISSN 0020-7543 print/ISSN 1366-588X online, 2003 Taylor & Francis Ltd., 5 pages.
Devadas Pillai et al., "Integration of 300 mm Fab Layouts and Material Handling Automation", 4 pages.
Chinese Patent Office, Office Action mailed Feb. 5, 2010, Application No. 2006101647334, 7 pages.
Taiwanese Patent Office, Office Action mailed Mar. 31, 2010, Application No. 095143539, 6 pages.

* cited by examiner

*Primary Examiner* — Gene Crawford
*Assistant Examiner* — Ramya Prakasam
(74) *Attorney, Agent, or Firm* — Haynes and Boone, LLP (57) ABSTRACT

System and method for implementing integrated transportation control in a wafer fabrication facility are described. One embodiment is a factory automation system for a wafer fabrication facility ("fab") comprising a plurality of bays, wherein each of the bays comprise a plurality of equipment interconnected by an intrabay overhead transport ("OHT") system, and first and second interbay OHT systems each for interconnecting the intrabay OHT systems. The factory automation system comprises a manufacturing execution system ("MES") for providing lot information regarding wafers being processed in the fab, a material control system ("MCS") for providing traffic information regarding transportation of wafers in the fab, and an integrated transportation control ("ITC") system for using the lot information from the MES and the traffic information from the MCS for selecting a destination and a route to the selected destination for a wafer carrier containing wafers in response to a transfer request.

19 Claims, 6 Drawing Sheets

INTEGRATED TRANSPORTATION CONTROL FOR WAFER FABRICATION FACILITY

BACKGROUND

The manufacture of semiconductor devices involves the performance of a series of process steps using a variety of high tech production and metrology tools in a certain order and often within a certain period of time. The primary function of a wafer logistics system in a wafer fabrication facility, or "fab," is to deliver the wafers to each of the tools at the right time, as well as to track the location and status of the wafers throughout the process.

Automated material handling systems ("AHMS") are applied to wafer fabs to carry out the automated functions more efficiently, consistently, and safely than can be done via manual means. While growth in wafer size from 200 mm to 300 mm has rendered the fabrication process more economical in some respects, it has also placed additional demands on the process. Such demands include the necessity for cross-floor and cross-phase transportation and increased transportation volume, the combination of which often results in traffic jams. Additionally, the investment in the AMHS hardware is large.

When a wafer carrier, such as a front opening unified pod ("FOUP"), containing wafers is to be transferred, a manufacturing execution system ("MES") determines to what destination in the fab the wafer carrier should be transferred. Currently, this decision is based on production data only and without consideration for real-time traffic conditions in the fab. Once the destination decision has been made, the MES sends a transfer request to a material control system ("MCS"), which calculates a detailed transportation route using a route search engine and then notifies a transfer manager to execute the transfer step-by-step. At present, the route search engine does not take into consideration production data when determining the transportation route.

BRIEF DESCRIPTION OF THE DRAWINGS

The features and advantages of an integrated transportation control system according to the present invention will be more clearly understood from the following description taken in conjunction with the accompanying drawings in which like reference numerals designate similar or corresponding elements, regions, and portions, and in which.

DETAILED DESCRIPTION

Figure 1A:
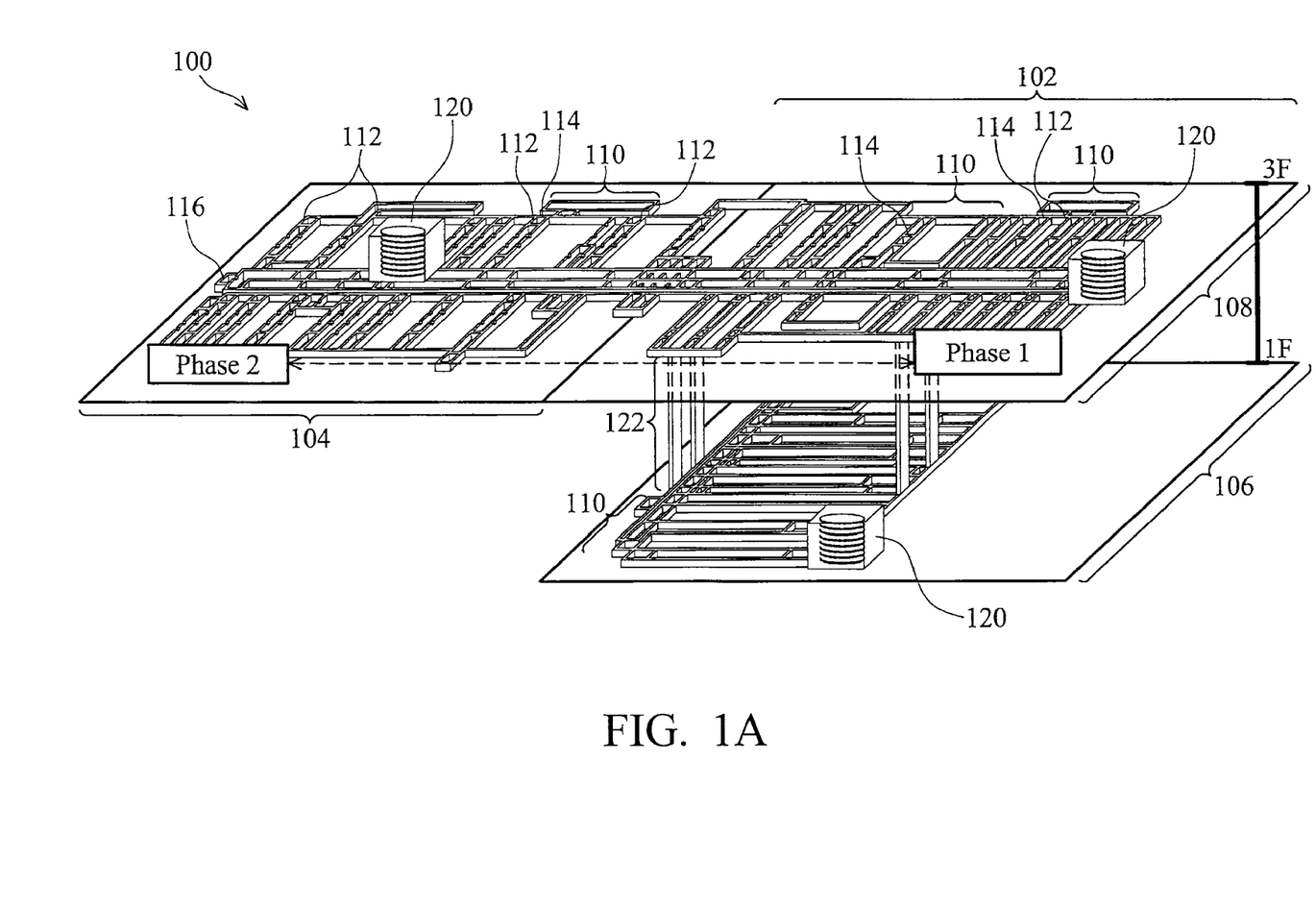
FIG. 1A is a diagram illustrating a 300 mm wafer fab in accordance with one embodiment.

FIG. 1A is a diagram illustrating a 300 mm wafer fab 100 in accordance with one embodiment. The fab 100 may be referred to as a "Gigafab" as it includes multiple phases, respectively designated in FIG. 1 by reference numerals 102 and 104, and multiple floors, respectively designated in FIG. 1 by reference numerals 106 and 108. A "cross-floor transfer job" involves the transfer of a wafer carrier, or FOUP, from one of the floors 106, 108, to the other. Similarly, a "cross-phase transfer job" involves the transfer of a wafer carrier, or FOUP, from one of the phases 102, 104, to the other.

Each phase 102, 104, includes a plurality of bays 110 each comprising process tools, or equipment, 112. The equipment 112 within each bay 110 is interconnected in by an intrabay overhead transport ("OHT") system 114. The bays 110 are interconnected via an interbay OHT system 116, which is alternatively referred to herein as a "super highway". As will be familiar to those of ordinary skill in the relevant art, the intrabay OHT systems 114 and the interbay OHT system 116 comprise overhead tracks on which OHT vehicles (not shown) transport FOUPs containing lots of wafers to be processed to and from equipment 112, often via stockers 120. A cross-floor transportation system 122 comprising lifters is also provided for implementing cross-floor transfer of FOUPs.

Figure 1B:
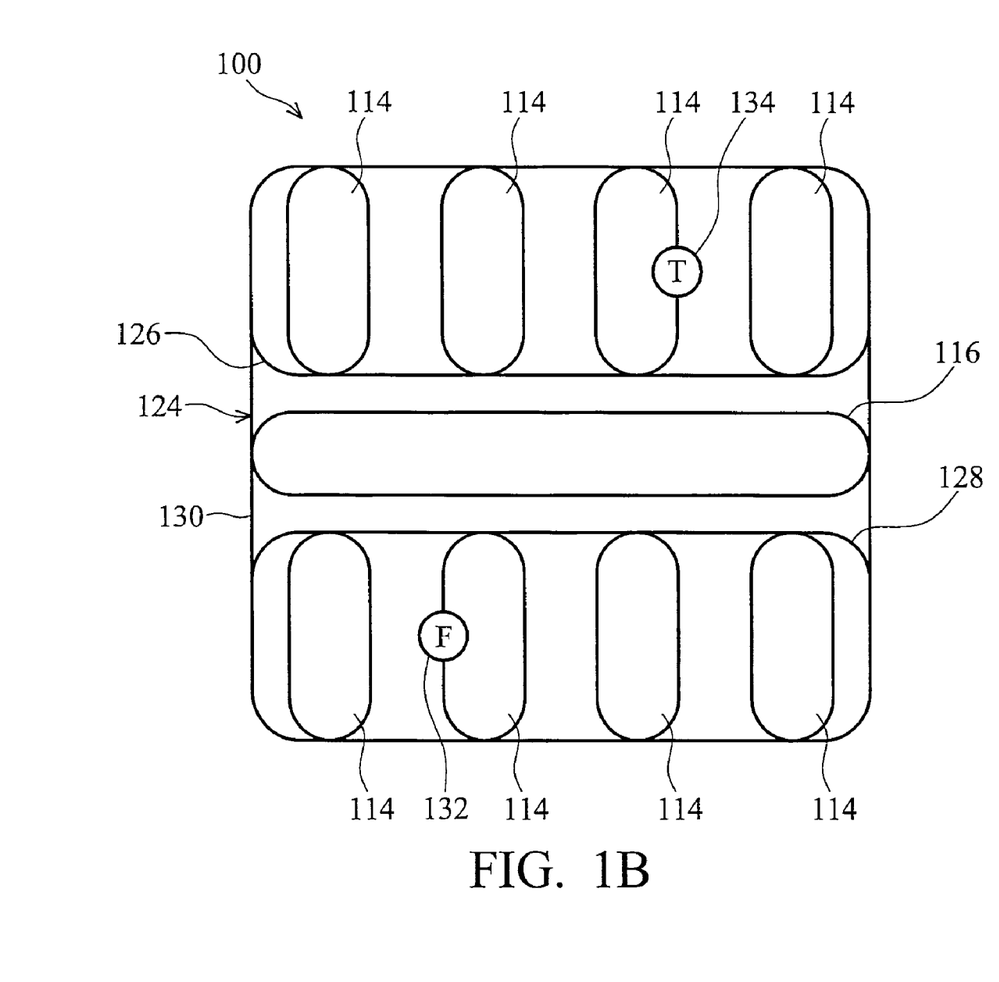
FIG. 1B is a simplified diagram of the transport system of one phase of the 300 mm wafer fab of FIG. 1A.

FIG. 1B is a simplified diagram of the transport system of one phase, e.g., the phase 104, of the fab 100. As shown in FIG. 1B, in addition to being interconnected via the super highway 116, the intrabay OHT systems 114 are also interconnected by second OHT system 124 comprising tracks 126, 128, and 130. It will be recognized that transportation of a FOUP from one point to another via the OHT system 124 will be slower than transportation of the same FOUP between the same two points via the super highway 116 due at least in part to the greater distance that must be traveled using the former. As will be described in greater detail below, in accordance with an embodiment described herein, assuming a FOUP is to be transferred from a location 132 to a location 134 in the fab 100, if the FOUP contains a high priority lot, such as a super hot lot, interbay transportation of the FOUP may be accomplished via the super highway 116. Conversely, if the FOUP does not contain a high priority lot, interbay transportation of the FOUP will be accomplished via the OHT system 124, which is also referred to herein as the "outside bay".

Figure 2:
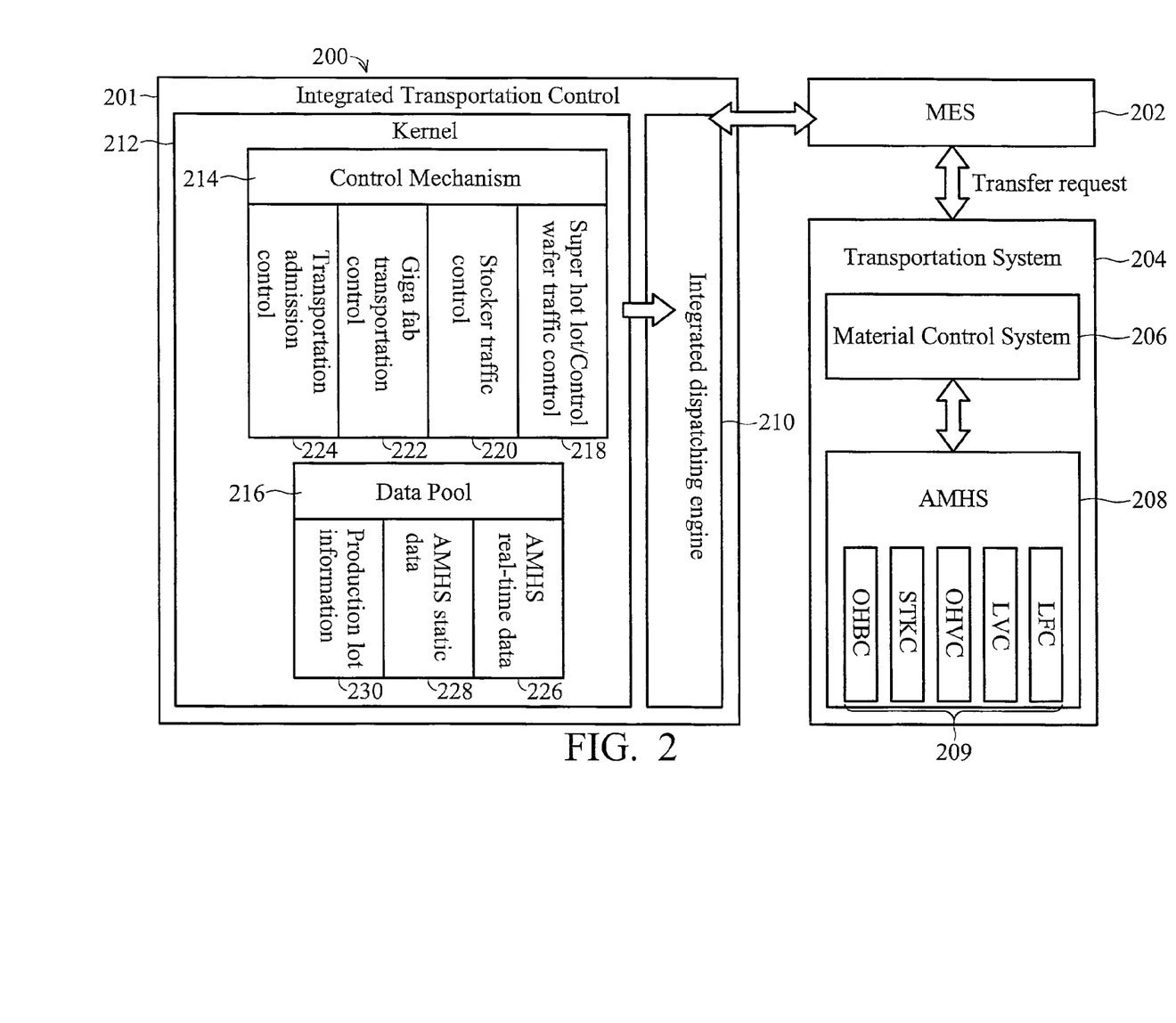
FIG. 2 is a block diagram illustrating a factory automation system in which an integrated transportation control ("ITC") system of one embodiment may be implemented.

FIG. 2 is a block diagram illustrating a factory automation system 200 comprising an integrated transportation control ("ITC") system 201 in accordance with one embodiment, which may be implemented in the fab 100 illustrated in FIG. 1. Responsive to a determination that a FOUP is to be transferred from one destination to another within the fab 100, an MES 202 determines the destination and generates a transfer request to a transportation system 204 comprising a material control system ("MCS") 206 and an AMHS 208. As shown in FIG. 2, the AMHS 208 includes a plurality of control modules, collectively designated by a reference numeral 209. In accordance with the illustrated embodiment, the ITC system 201 comprises an integrated dispatching engine 210 connected to a kernel 212. The kernel 212 comprises a control mechanism 214 and a data pool 216. As will be described in greater detail below, the control mechanism 214 includes a super hot lot/control wafer traffic control ("SHL/CWTC") mechanism 218, a stocker traffic control ("STC") mechanism 220, a gigafab transportation control ("GTC") mechanism 222, and a transportation admission control ("TAC") mechanism 224. The data pool 216 includes AMHS real time data 226, AMHS static data 228, and production lot property data 230.

As previously indicated, one aspect of the ITC system 200 is the SHL/CWTC mechanism 218. The purpose of the SHL/CWTC mechanism 218 is to reduce traffic on the super highway 116 (FIGS. 1A and 1B). In one embodiment, this is accomplished using static traffic control techniques to force transfers of FOUPs containing control wafer ("CW") lots to use the interbay OHT system, or outer bay, 124 (FIGS. 1A and 1B). This is further accomplished through use of real-time traffic control techniques to force traffic that would cause the super highway 116 to meet or exceed traffic specifications therefore (e.g., more than 16 transfer jobs), to use the outer bay 124 and to reject traffic that would cause the outer bay 124 to meet or exceed traffic specifications therefore (e.g., more than 28 transfer jobs).

Figure 3:
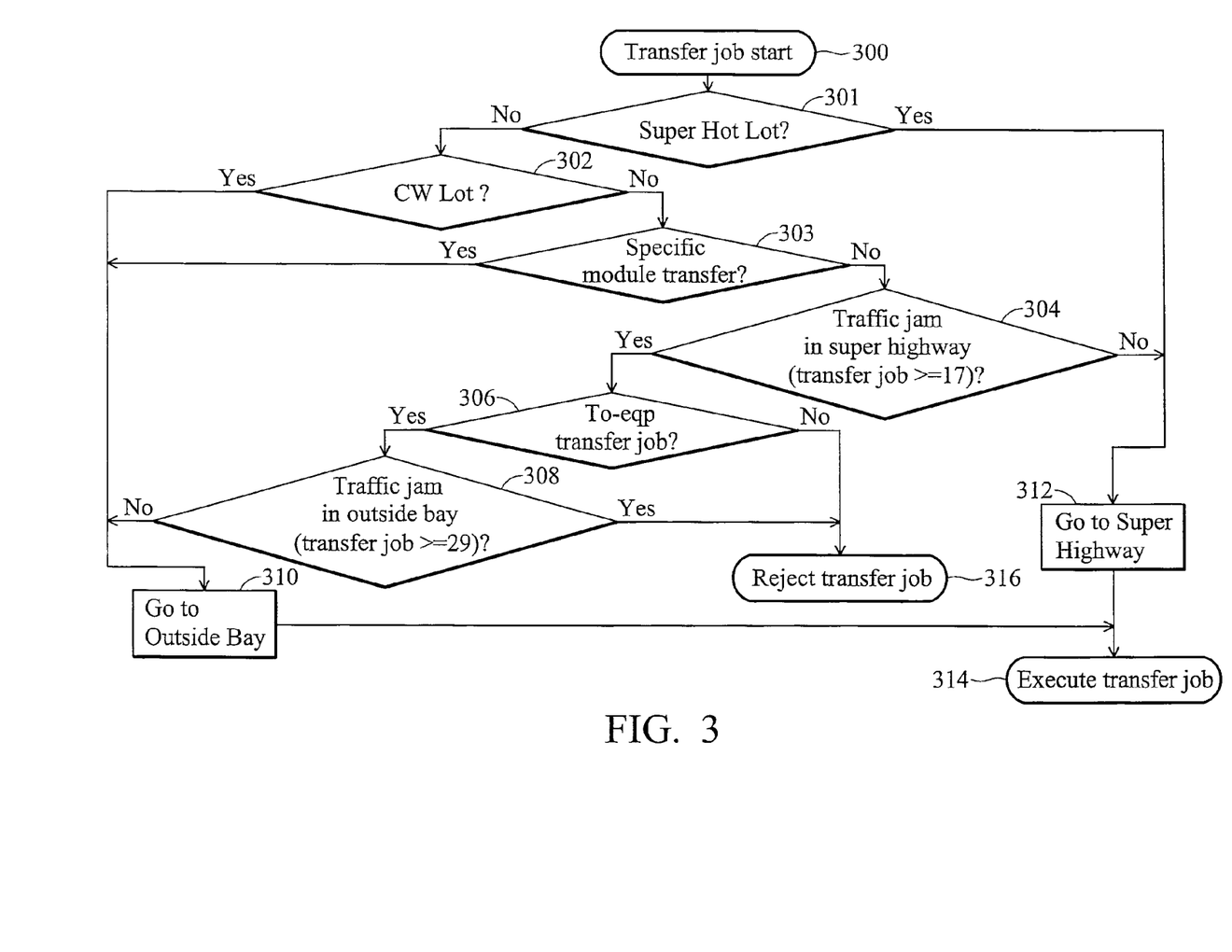
FIG. 3 is a flowchart illustrating operation of an embodiment of a stocker traffic control process of the ITC system of FIG. 2.

FIG. 3 is a flowchart illustrating operation of the SHL/CWTC mechanism 218 in accordance with one embodiment. In step 300, a transfer job is started. In response to the start of the transfer job, in step 301, a determination is made whether the transfer is of a super hot lot. As used herein, a "super hot lot" is a lot with top level priority. Super hot lots always move to the front of any queue at the entrance of each process tool. If the transfer is not of a super hot lot, execution proceeds to step 302, in which a determination is made whether the transfer is of a CW lot. If not, execution proceeds to step 303, in which a determination is made whether the transfer is of a specific module. If not, execution proceeds to step 304, in which a determination is made whether there is a traffic jam in the super highway 116. In one embodiment, a traffic jam is defined as more than 16 transfer jobs on the superhighway. If it is determined that there is a traffic jam on the super highway, execution proceeds to step 306, in which a determination is made whether the transfer job is a "to equipment" transfer. If so, execution proceeds to step 308, in which a determination is made as to whether there is a traffic jam in the outside bay 124. In one embodiment, a traffic jam in the outside bay 124 is defined as more than 28 transfer jobs being handled by the outside bay.

Responsive to a negative determination in step 306 or a negative determination in step 308, execution proceeds to step 310, in which the transfer job is directed to the outside bay 124. Alternatively, if a negative determination is made in step 304, execution proceeds to step 312, in which the transfer job is directed to the super highway 116. Upon completion of either step 310 or step 312, execution proceeds to step 314, in which the transfer job is executed. If a negative determination is made in step 306 or a positive determination is made in step 308, execution proceeds to step 316, in which the transfer job is rejected.

It will be recognized that the decisions made in steps 301, 302, 303, and 306 are based on lot information provided by the MES 202. Similarly, the decisions made in steps 304 and 308 are based on traffic information provided by the transportation system 204; particularly, the MCS 206.

As previously indicated, another aspect of the ITC system 200 is the STC mechanism 220. The objective of the STC mechanism 220 is to reduce or eliminate traffic jams that occur as a result of transfers to or from stockers. As used herein, a stocker in/out traffic jam is defined as more than four jobs transferred into/out of the stocker per minute. In particular, with regard to transfers to a stocker ("to stocker transfers"), the goal is to keep the number of transfer jobs in connection with each stocker to less than five; if a stocker has four or more transfer jobs, an attempt is made to choose a better destination (e.g., another stocker) as the destination for the transfer job. With regard to transfers from a stocker to equipment ("from stocker transfers"), an attempt is made to choose a better wafer carrier from the least busy stocker. Additionally, manual transfers between closely located stockers are forbidden by the process. Each of the foregoing are defined as static traffic control techniques. The STC mechanism 220 also implements real-time traffic control when transfers in all cross-devices (e.g., stockers, lifters) is greater than four by rejecting all manual stocker-to-stocker transfers.

Figure 4:
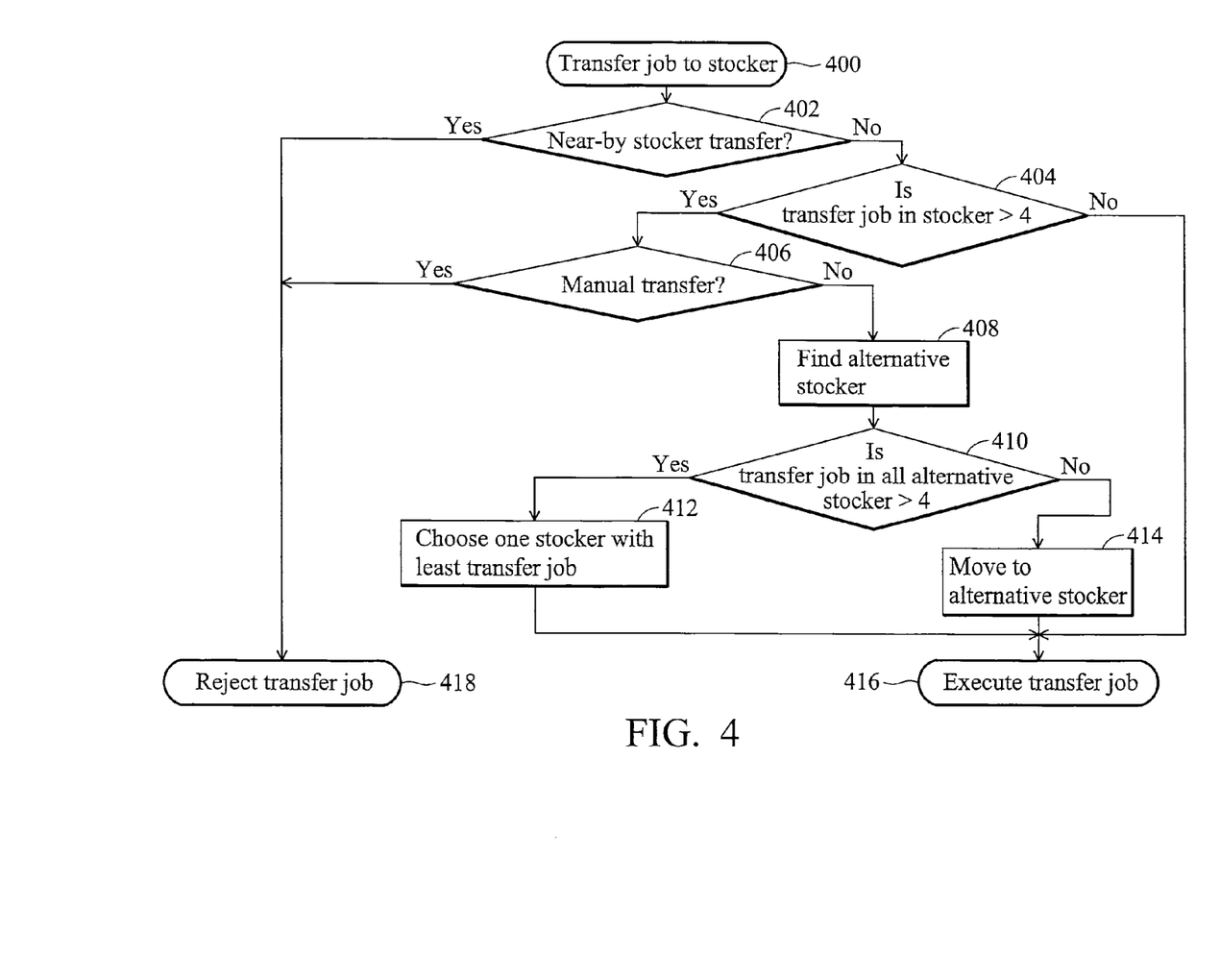
FIG. 4 is a flowchart illustrating operation of an embodiment of a super highway traffic control process of the ITC system of FIG. 2.

FIG. 4 is a flowchart illustrating operation of the STC mechanism 220 in accordance with one embodiment. In step 400, a transfer job to stocker instruction is received. In response, in step 402, a determination is made whether the requested transfer job is to a geographically proximate stocker. If not, in step 404, a determination is made whether number of transfer jobs in the stocker is greater than four. If a positive determination is made in step 404, execution proceeds to step 406, in which a determination is made whether the requested transfer is a manual transfer. If not, execution proceeds to step 408, in which an alternate stocker is located, and then to step 410, in which a determination is made whether the number of transfer jobs in all alternate stockers is greater than four. If so, execution proceeds to step 412, in which the stocker with the fewest transfer jobs is selected; otherwise, in step 414, the transfer job is moved to the alternate stocker identified in step 408. Upon completion of either step 412 or step 414, or upon a negative determination in step 404, execution proceeds to step 416, in which the transfer job is executed. Alternatively, upon a positive determination is made in step 402 or in step 406, execution proceeds to step 418, in which the transfer job is rejected.

It will be recognized that the decisions made in steps 402 and 406 are based on lot information provided by the MES 202. Similarly, the decisions made in steps 404, 410, and 412 are based on traffic information provided by the transportation system 204; particularly, the MCS 206.

As previously indicated, another aspect of the ITC system 200 is the GTC mechanism 222. The purpose of the GTC mechanism 222 is to reduce the number of traffic jams that occur during cross-floor transfers. In one embodiment, this is accomplished using static traffic control techniques to balance the usage load of cross-floor devices and ports and using real-time traffic control techniques when the number of transfer jobs in all cross devices (e.g., stockers, lifters) is greater than four by limiting the unnecessary cross-floor transportation by lot attributes (e.g., dummy and bank FOUPs) and by choosing a same floor destination to avoid using cross-floor transportation.

Figure 5:
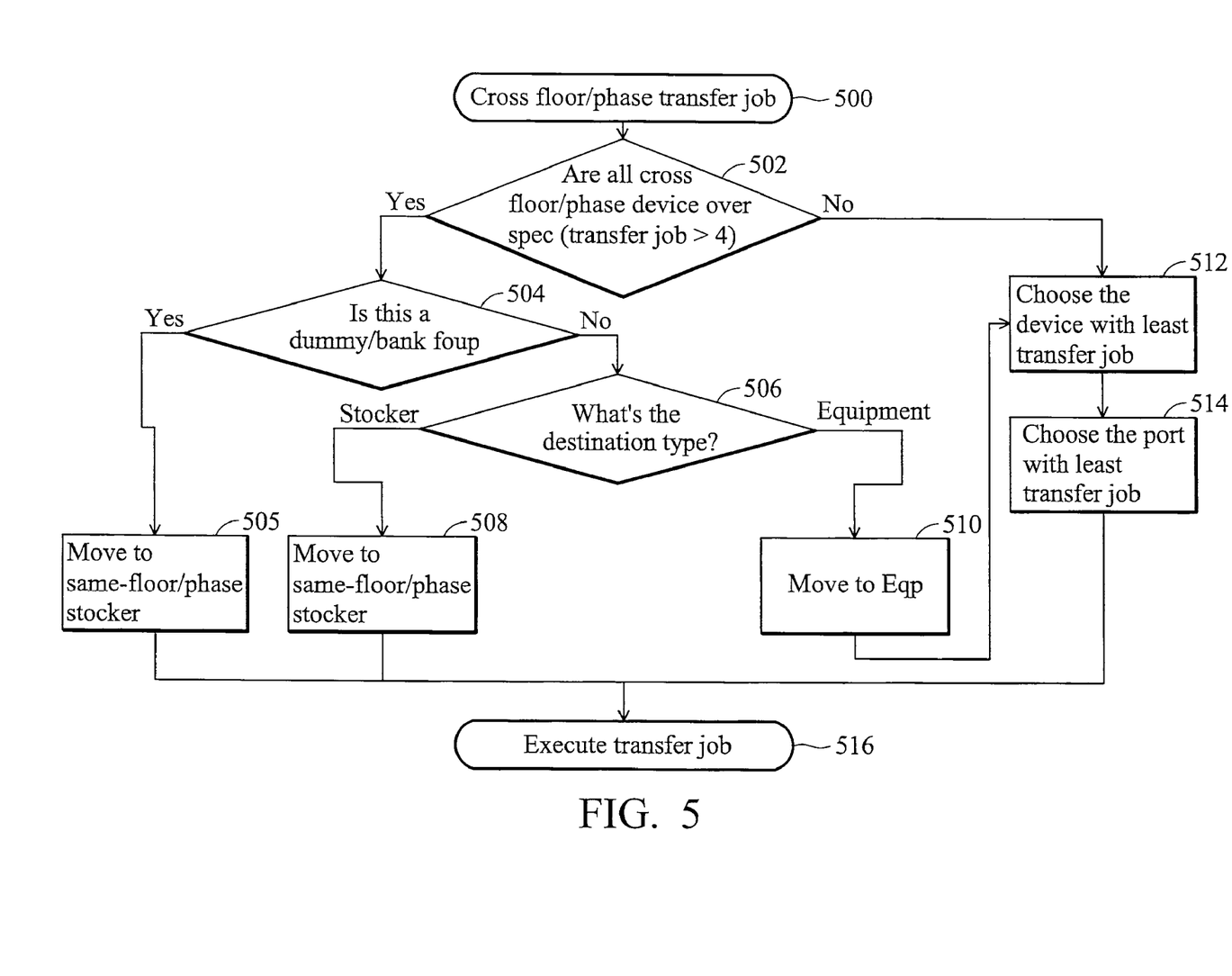
FIG. 5 if a flowchart illustrating operation of an embodiment of a cross-floor transportation process of the ITC system of FIG. 2.

FIG. 5 is a flowchart illustrating operation of the GTC mechanism 222 in accordance with one embodiment. In step 500, a cross-floor/cross-phase transfer job request is received. In response, in step 502, a determination is made whether all cross-floor/cross-phase devices have met or exceeded traffic specifications therefore. In one embodiment, a cross-floor/cross-phase device is over specification if the number of transfer jobs being handled by the device is greater than four. If a positive determination is made in step 502, execution proceeds to step 504, in which a determination is made whether the transfer request relates to a FOUP containing a dummy or a bank lot. If so, in step 505, the transfer job is directed to a same-floor stocker. If a negative determination is made in step 504, execution proceeds to step 506, in which a determination is made as to the destination type. If in step 506, it is determined that the destination is a stocker, in step 508, the transfer job is directed to a same-floor stocker. If in step 506 it is determined that the destination is equipment, in step 510, the transfer job is directed to the specified equipment. Upon a negative determination in step 502 or upon completion of step 510, execution proceeds to step 512, in which the device with the fewest number of transfer jobs is identified, and then to step 514, in which the port of the device identified in step 512 with the fewest number of transfer jobs is identified. Upon completion of step 505, 508, or 514, execution proceeds to step 516, in which the transfer job is executed.

It will be recognized that the decisions made in steps 504 and 506 are based on lot information provided by the MES 202. Similarly, the decisions made in steps 502, 512, and 514 are based on traffic information provided by the transportation system 204; particularly, the MCS 206.

While the preceding description shows and describes one or more embodiments, it will be understood by those skilled in the art that various changes in form and detail may be made therein without departing from the spirit and scope of the present disclosure. For example, while the present disclosure illustrates the use of a plasma treatment during the fabrication of borderless interconnections, it is understood that the plasma treatment may be utilized in many other fabrication processes. Therefore, the claims should be interpreted in a broad manner, consistent with the present disclosure.

What is claimed is:

1. A factory automation system for a wafer fabrication facility ("fab") comprising a plurality of bays, wherein each of the bays comprise a plurality of equipment interconnected by an intrabay overhead transport ("OHT") system, and first and second interbay OHT systems each for interconnecting the intrabay OHT systems, the factory automation system comprising:
   a manufacturing execution system ("MES") for providing lot information regarding wafers being processed in the fab;
   a material control system ("MCS") for providing traffic information regarding transportation of wafers in the fab; and
   an integrated transportation control ("ITC") system for using the lot information from the MES and the traffic information from the MCS for selecting a destination and a route to the selected destination for a wafer carrier containing wafers in response to a transfer request;
   wherein the ITC system includes a super hot lot control mechanism for reducing traffic on the first interbay OHT system.

2. The factory automation system of claim 1 wherein the super hot lot control mechanism comprising means selected from a group consisting of:
   means for preventing transfers of wafer carriers containing control wafer lots via the first interbay OHT system,
   means for preventing transfers via the interbay OHT system when traffic specifications for the first interbay OHT system have been met or exceeded, and
   means for preventing transfers via the second interbay OHT system when traffic specifications for the second interbay OHT systems have been met or exceeded.

3. The factory automation system of claim 1 wherein the ITC further comprises a stocker traffic control mechanism for reducing a number of traffic jams resulting from transfers to or from stockers in the fab.

4. The factory automation system of claim 3 wherein the stocker traffic control mechanism comprising means selected from a group consisting of:
   means for limiting a number of transfers to and from each of the stockers to a maximum number, and
   means for rejecting all transfers to one of the stockers that is proximate a pre-transfer location of the wafer carrier.

5. The factory automation system of claim 1 wherein the ITC further comprises a gigafab transportation control mechanism for reducing a number of traffic jams that occur during cross-floor transfers.

6. The factory automation system of claim 5 wherein the gigafab transportation control mechanism further comprising means selected from a group consisting of:
   means for balancing a usage load of cross-floor devices and ports thereof,
   means for limiting cross-floor transportation when a maximum number of transfer jobs in all cross-floor devices by lot attribute exceeds a predefined maximum, and
   means for substituting a same-floor destination for a cross-floor destination when certain conditions are met.

7. A method of implementing a factory automation system for a wafer fabrication facility ("fab") comprising a plurality of bays, wherein each of the bays comprise a plurality of equipment interconnected by an intrabay overhead transport ("OHT") system, and first and second interbay OHT systems each for interconnecting the intrabay OHT systems, the method comprising, responsive to a transfer request relating to a wafer carrier:
   obtaining lot information related to the transfer request from a manufacturing execution system ("MES");
   obtaining traffic information related to the transfer request from a material control system ("MCS"); and
   using the lot information and the control information to select a destination and a route to the selected destination in fulfillment of the transfer request;
   wherein the using the lot information and control information to select a destination and a route to the selected destination comprises, if the transfer request relates to transfer of a super hot lot, routing the transfer via the first interbay OHT system.

8. The method of claim 7 wherein the using the lot information and control information to select a destination and a route to the selected destination comprises steps of:
   if the transfer request relates to transfer of a control wafer lot, routing the transfer via the second interbay OHT system;
   if the transfer request relates to transfer of a specific module, routing the transfer via the second interbay OHT system.

9. The method of claim 8 wherein the using the lot information and control information to select a destination and a route to the selected destination further comprises steps of:
   if the transfer request does not relate to transfer of a super hot lot, a control wafer lot, or a specific module, traffic on the first interbay OHT system has exceeded a limit therefor, and the selected destination is not one of the process tools, rejecting the transfer request;
   if the transfer request does not relate to transfer of a super hot lot, a control wafer lot, or a specific module, traffic on the first interbay OHT system has exceeded the limit therefor, the selected destination is one of the process tools, and traffic on the outside bay has not exceeded a limit therefor, routing the transfer via the one of the intrabay OHT systems; and
   if the transfer request does not relate to transfer of a super hot lot, a control wafer lot, or a specific module, traffic on the first interbay OHT system has exceeded the limit therefor, the selected destination is one of the process tools, and traffic on the outside bay has exceeded the limit therefor, rejecting the transfer request.

10. The method of claim 7 wherein the using the lot information and control information to select a destination and a route to the selected destination comprises:
   limiting a number of transfers to and from each of a plurality of stockers to a maximum number, and
   rejecting all transfers to one of the stockers that is proximate a pre-transfer location of the wafer carrier.

11. The method of claim 7 wherein the using the lot information and control information to select a destination and a route to the selected destination comprises:
   balancing a usage load of cross-floor devices and ports,
   limiting cross-floor transportation when a maximum number of transfer jobs in all cross-floor devices by lot attribute exceeds a predefined maximum, and
   substituting a same-floor destination for a cross-floor destination when certain conditions are met.

12. A factory automation system for a wafer fabrication facility ("fab") comprising a plurality of bays, wherein each of the bays comprise a plurality of equipment interconnected by an intrabay overhead transport ("OHT") system, and first and second interbay OHT systems each for interconnecting the intrabay OHT systems, the factory automation system comprising:
   means for providing lot information regarding wafers being processed in the fab;
   means for providing traffic information regarding transportation of wafers in the fab; and
   means for selecting a destination and a route to the selected destination for a wafer carrier containing wafers in response to a transfer request using the lot information and the traffic information;
   wherein the means for selecting includes a super hot lot control mechanism for reducing traffic on the interbay OHT system.

13. The factory automation system of claim 12 wherein the super hot lot control mechanism comprising means selected from a group consisting of:
   means for preventing transfers of wafer carriers containing control wafer lots via the interbay OHT system,
   means for preventing transfers via the interbay OHT system when traffic specifications for the interbay OHT system have been met or exceeded, and
   means for preventing transfers the second interbay OHT system when traffic specifications for the interbay OHT system have been met or exceeded.

14. The factory automation system of claim 12 wherein the means for selecting further comprises a stocker traffic control mechanism for reducing a number of traffic jams resulting from transfers to or from stockers in the fab.

15. The factory automation system of claim 14 wherein the stocker traffic control mechanism comprising means selected from a group consisting of:
   means for limiting a number of transfers to and from each of the stockers to a maximum number, and
   means for rejecting all transfers to one of the stockers that is proximate a pre-transfer location of the wafer carrier.

16. The factory automation system of claim 12 wherein the means for selecting further comprises a gigafab transportation control mechanism for reducing a number of traffic jams that occur during cross-floor transfers.

17. The factory automation system of claim 16 wherein the gigafab transportation control mechanism further comprising means selected from a group consisting of:
   means for balancing a usage load of cross-floor devices and ports thereof,
   means for limiting cross-floor transportation when a maximum number of transfer jobs in all cross-floor devices by lot attribute exceeds a predefined maximum, and
   means for substituting a same-floor destination for a cross-floor destination when certain conditions are met.

18. The factory automation system of claim 12 wherein the means for providing lot information regarding wafers being processed in the fab comprises a manufacturing execution system.

19. The factory automation system of claim 12 wherein the means for providing traffic information regarding transportation of wafers in the fab comprises a material control system.

* * * * *